United States Patent Office 3,449,113
Patented June 10, 1969

3,449,113
METHOD OF COMBATING UNDESIRED PLANT GROWTH WITH SUBSTITUTED CARBOXAMIDO-OXYALKANOIC ACIDS AND SALTS THEREOF
Ralph P. Neighbors, Olathe, Kans., assignor to Gulf Oil Corporation, Pittsburgh, Pa., a corporation of Pennsylvania
No Drawing. Continuation-in-part of application Ser. No. 374,813, June 12, 1964. This application May 26, 1967, Ser. No. 641,487
The portion of the term of the patent subsequent to Aug. 6, 1985, has been disclaimed
Int. Cl. A01n 9/24; C07c 69/00
U.S. Cl. 71—106                    4 Claims

ABSTRACT OF THE DISCLOSURE

Undesired plant growth is combated by applying to the locus of the plants certain carboxamidoöxyalkanoic acids or salts thereof which possess varied selectivity of herbicidal action.

SUMMARY OF INVENTION

This application is a continuation-in-part of U.S. Ser. No. 374,813 filed June 12, 1964, in which it was disclosed that various aminoöxy compositions are useful as selective herbicides. The prior application disclosed a variety of types of selectivity among the different compounds, there being no obvious correlation between variations in structural formula and the activity or selectivity in most instances. The present application is directed to use of one class of compositions, the carboxamidoöxyalkanoic acids and their water-soluble salts.

Briefly, this invention is the method of combating undesired plant growth which comprises applying to the locus of the plant a herbicidally effective amount of a compound selected from carboxamidoöxyalkanoic acids and their water-soluble salts represented by the general structural formula $$X-\overset{O}{\underset{}{C}}-\overset{H}{\underset{}{N}}-O-\overset{R}{\underset{H}{C}}-(CH_2)_n-COOY$$

in which X represents a member of the group consisting of

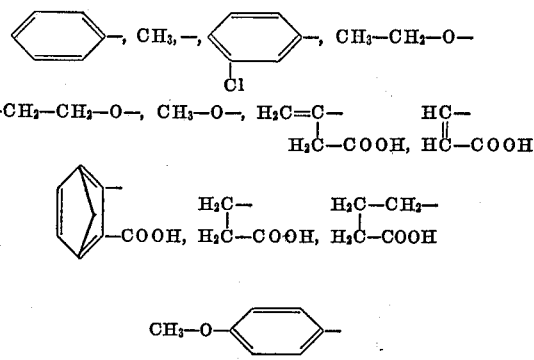

and

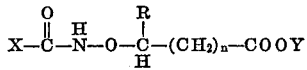

R represents a member of the group consisting of hydrogen, methyl and lower alkyl, $n$ may vary within the range of zero to two and Y is selected from hydrogen and cations.

DETAILED DESCRIPTION OF THE INVENTION

So as to make clear the characteristics of the selective herbicides employed in the method, the procedure and results of controlled comparative tests on a variety of plant species are presented below.

Experimental procedure for herbicide use

A water suspension of the chemical is prepared by combining 0.4 gram of the chemical to be tested with 4 ml. of a solvent mixture (3 parts Emulphor EL-719 combined with one part xylene and one part kerosene) and then adding sufficient warm water to make 40 ml. of mixture. Emulphor EL-719 is described as a polyoxyethylated vegetable oil.

Oats, wheat, peas, radish, flax, millet, alfalfa, tomatoes, and sugar beets are planted in 4 in. pots in the greenhouse. Ten to eighteen days after the emergence of the plants, they are sprayed with the above prepared water emulsions at a rate of 5 pounds of the active chemical per acre and a spray volume of 60 gallons per acre. Seven days after application, the plants are observed and the results of the treatment are as shown in the table.

The plants are rated as follows:

C=Chlorosis (bleaching)
N=Necrosis
G=Growth inhibition
K=Non-emergence
F=Formative effect (abnormal form of growth)
0=No effect
1=Slight effect
2=Moderate effect
3=Severe effect
4=Maximum effect or dead plants

TABLE

| | Post-emergent Activity at 5 lb./Acre | | | | | | | | | |
|---|---|---|---|---|---|---|---|---|---|---|
| Structural Formula of Compound | Tomato | Millet | Flax | Soybeans | Corn | Wheat | Oats | Radish | Sugar Beets | Alfalfa |
| -C(O)-N(H)-O-CH(CH₃)-COOH (M.P. 132-3° C.) | N4 | N4 | N1 | N4 | G3, N1 | N2 | N1 | N2 | N4 | N1, G2 |
| -C(O)-N(H)-OCH₂-COOH (M.P. 144-5°) | N4 | N4 | G2, N1 | N4 | N4 | N4 | N2 | N4 | N4 | N4 |
| Cl--Cl -C(O)-N(H)-O-CH(CH₃)-COOH (M.P. 201-3°) | N4 | N2 | N1, G2 | G2 | F1, G2 | N1 | N1 | N2 | N4 | N1 |

| Structural Formula of Compound | Post-emergent Activity at 5 lb./Acre ||||||||||
|---|---|---|---|---|---|---|---|---|---|---|
| | Tomato | Millet | Flax | Soybeans | Corn | Wheat | Oats | Radish | Sugar Beets | Alfalfa |
| Cl-C$_6$H$_4$-C(O)-NH-O-CH$_2$-COOH (4-Cl) (M.P. 198–200°) | N4 | N4 | N2 | G2, C1 | N1 | N2 | C1 | C2 | N4 | N2 |
| 3,4-Cl$_2$-C$_6$H$_3$-C(O)-NH-O-CH$_2$-COOH (M.P. 147–9°) | N4 | N4 | N3 | G2 | N1 | N2 | N1 | N4 | N4 | N2 |
| 2,4-Cl$_2$-C$_6$H$_3$-C(O)-NH-O-CH$_2$-COOH (M.P. 168–70°) | N4 | N4 | G2, N2 | G1 | N1 | N1 | 0 | 0 | N2 | 0 |
| 2-Cl-C$_6$H$_4$-C(O)-NH-O-CH(CH$_3$)-COOH (M.P. 155–7°) | N4 | N3 | N1 | F1, G2 | N1 | N1 | 0 | N1 | N1 | F1, N1 |
| C$_6$H$_5$-C(O)-NH-O-CH$_2$-COOK (decomp. 193°) | N4 | N4 | N2 | G3, N3 | G3, N3 | N1 | N1 | N3 | N4 | 0 |
| C$_6$H$_5$-C(O)-NH-OCH$_2$COO$^-$ $^+$H$_3$NC$_4$H$_9$ (In aqueous solution) | N4 | N4 | G3, C2 | G3, N3 | N4 | N4 | G2, C3 | G3, C2 | G3, C3 | N4 |
| CH$_3$O-C$_6$H$_4$-C(O)-NH-OCH$_2$COOH (M.P. 174–6°) | N4 | N4 | 0 | G2, N1 | G3, N3 | N4 | N3 | N3 | N4 | N2 |
| CH$_3$O-C$_6$H$_4$-C(O)-NH-O-CH(CH$_3$)-COOH (M.P. 156–8°) | N4 | G3, N3 | 0 | N2 | N2 | N1 | N1 | G2 | N4 | N1 |
| C$_6$H$_5$-C(O)-NH-OCH$_2$COO$^-$·$^+$HN-C$_6$H$_5$ (aqueous solution) | N4 | N4 | 0 | G3, N2 | G3, N3 | N1 | N1 | N2 | N1 | N1 |
| 3-Cl-C$_6$H$_4$-C(O)-NH-OCH$_2$CO$_2$H (M.P. 153–5°) | N4 | N4 | N3 | N4 | G2, N2 | N1 | N1 | N2 | N4 | G2, N2 |
| C$_6$H$_5$-C(O)-NH-OCH$_2$CO$_2^-$NH$_4^+$ (In aqueous solution) | N4 | N4 | G3 | N1, G1 | N3, G3 | N1, G1 | N1, G1 | N3 | N4 | N1 |
| 3,4-Cl$_2$-C$_6$H$_3$-C(O)-NH-OCH$_2$CO$_2^-$NH$_4^+$ (In aqueous solution) | N4 | N2, G1 | G2 | N1, G1 | N3, G3 | 0 | 0 | N1 | N4 | 0 |
| CH$_3$-C(O)-NH-OCH$_2$COOH (M.P. 136–7°) | N4 | N4 | N4 | N4 | N4 | N4 | N4 | N4 | N4 | N4 |
| CH$_3$-CH$_2$-O-C(O)-NH-OCH$_2$COOH (M.P. 77–79° C.) | N4 | N4 | N1 | N1 | N4 | N2 | N1 | G2 | N4 | G2 |
| Cl-CH$_2$-CH$_2$-O-C(O)-NH-O-CH$_2$COOH (M.P. 70–72°) | N4 | N4 | N2, G2 | N2, G4 | N1 | N1, G3 | N1 | N2, G3 | N4 | ---------- |
| CH$_3$-O-C(O)-NH-O-CH$_2$COOH (M.P. 85–87°) | N4 | N4 | N3, G3 | N4 | N4 | N4 | N4 | N4 | N4 | N4 |
| CH$_3$-C(O)-NH-O-CH$_2$CH$_2$COOH (M.P. 88–90° C.) | N4 | N4 | N4 | N3, G4 | N4 | N3 | N3 | N4 | N4 | C2, G2 |

| Structural Formula of Compound | Post-emergent Activity at 5 lb./Acre ||||||||||
|---|---|---|---|---|---|---|---|---|---|---|
| | Tomato | Millet | Flax | Soybeans | Corn | Wheat | Oats | Radish | Sugar Beets | Alfalfa |
| $H_2C=C-\underset{\underset{H}{\mid}}{\overset{\overset{CH_2-COOH}{\mid}}{C}}-N-OCH_2-COONa$ <br> $\phantom{H_2C=C-}\overset{\parallel}{O}$ <br> (M.P. 172°) | ---------- | N4 | F1 | N1, G3 | N1, G2 | 0 | 0 | N2 | G2 | 0 |
| $HC-COOH$ <br> $H\overset{\parallel}{C}-\underset{\underset{H}{\mid}}{C}-N-O-CH_2-COONa$ <br> $\phantom{HC-}\overset{\parallel}{O}$ <br> (M.P. 178-180°) | ---------- | N4 | N4 | G2 | G2 | G3 | N4 | N4 | N4 | 0 |
| 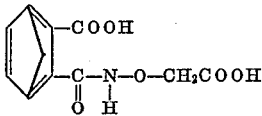 <br> (M.P. over 250°) | ---------- | N4 | N4 | N4 | G1 | N4 | G2 | N4 | N4 | N4 |
| $H_2C-COOH$ <br> $H_2\overset{\mid}{C}-\underset{\underset{H}{\mid}}{C}-N-O-CH_2-COONa$ <br> $\phantom{H_2C-}\overset{\parallel}{O}$ <br> (M.P. 178-180°) | ---------- | N4 | G3 | G3 | G3 | N4 | G3 | N4 | N4 | G3 |
| $H_2C-COOH$ <br> $H_2\overset{\mid}{C}-CH_2-\underset{\underset{H}{\mid}}{C}-N-O-CH_2-COONa$ <br> $\phantom{H_2C-CH_2-}\overset{\parallel}{O}$ <br> (M.P. 191-193°) | N4 | N4 | G3 | G2 | N1 | G1 | G2 | N4 | N4 | G2 |

Upon reduction of the rate of application, selective characteristics of the herbicides become more pronounced. Furthermore, some of the specifically exemplified compounds are also effective as pre-emergent herbicides. This is true of the compound having the structural formula:

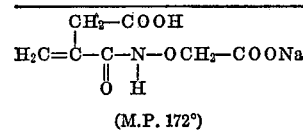

and its water-soluble salts. This compound is particularly useful in combating weeds in corn. Benzamidoöxy-acetic acid and its water-soluble salts have been found to possess unusual utility for combating certain weeds in sugar beet fields. The method of accomplishing this specific purpose is the subject of U.S. Ser. No. 543,789, now U.S. Patent 3,396,009, filed Apr. 20, 1966 as a continuation-in-part of U.S. Ser. No. 374,813.

Manufacture of herbicides

The herbicides which may be employed in the method of this invention are not articles of commerce, some of them belonging to novel classes of compounds, not previously made in the laboratory. So that the method of this invention may be more readily practiced, there are presented below representative procedures for preparation of various individual compounds. Suitable modifications of these procedures may be used to prepare other compounds, including those disclosed as illustrative examples in the table. The 3-chlorobenzohydroxamic acids may be prepared by modification of the general procedure of Organic Syntheses Collective. Vol. II, pg. 67. Aminoöxyacetic acid, as well as other α-aminoöxy acids and hydrochlorides are readily prepared by methods described in J. Chem. Soc., 1960, pages 225-229. The reaction of acetone oxime with methyl acrylate to yield the 3-isopropylideneaminoöxypropionate is described in Jour. Med. and Pharm. Chem., vol. 5, pg. 475 (1962).

Preparation of 3-aminoöxypropionic acid hydrochloride

A mixture of methyl 3-isopropylideneaminoöxypropionate (15.0 g., 0.094 mol derived from acetone oxime and methyl acrylate) concentrated hydrochloric acid (75 ml.), and water (75 ml.) was stirred and heated to boiling. Approximately 25 ml. of distillate was collected, then the residual mixture was stripped under reduced pressure and the residue stirred 1 hour with isopropyl alcohol (100 ml.). Filtration and subsequent crystallization from an ethanol-ether mixture gave 7.3 g. (55%, M.P. 152-4° C.) of the desired compound.

Analysis.—Calculated for $C_3H_8ClNO_3$: C, 25.46; H, 5.68; N, 9.90. Found: C, 25.76; H, 5.49; N, 9.99.

Preparation of 3-acetamidoöxypropionic acid

A-aminoöxypropionic acid hydrochloride (14.1 g., 0.1 mol), acetic anhydride (15.3 g., 0.15 mol), and glacial acetic acid was stirred, heated, and refluxed 4 hours. The mixture was then cooled and stripped under reduced pressure on a steam bath. The residual material was then stirred 45 min. with dichloromethane (50 ml.). After filtration and drying there was obtained 5.6 g. (38%, M.P. 88-90° C.) of 3-acetamidoöxypropionic acid.

Calculated for $C_5H_9NO_4$: C, 40.81; H, 6.16; N, 9.52. Found: C, 40.77; H, 6.08; N, 9.53.

Preparation of m-chlorobenzamidoöxyacetic acid

A mixture of m-chlorobenzohydroxamic acid (0.1 mol, 16.5 g.), bromoacetic acid (0.1 mol, 13.9 g.), sodium hydroxide (0.2 mol, 8.0 g.), ethanol (150 ml.) and water (150 ml.) was stirred, heated, and refluxed 5 hours. The mixture was then cooled and acidified with dilute hydrochloric acid. The mixture was then extracted with ethyl acetate (2× 250 ml.) and the extracts were combined and dried over magnesium sulfate. Dilution of the dried extract with n-hexane precipitated the desired product which was removed by filtration and dried. There was obtained 17.1 g. (74%, M.P. 153-5° C.).

Calculated for $C_9H_8ClNO_4$: C. 47.07; H, 3.51; N, 6.10; Cl, 15.44. Found: C. 47.25; H, 3.86; N, 5.74; Cl, 15.44.

Preparation of N-(ethoxycarbonyl)aminoöxyacetic acid

Bromoacetic acid (0.2 mol) was dissolved in water (50 ml.) and neutralized to a phenophthalein end-point with 10% sodium hydroxide. N-hydroxyurethane (0.2 mol) was added, followed by the addition of 10% sodium hydroxide (0.2 mol). The mixture was stirred 2 hours at room temperature, then concentrated to 50 ml. volume under reduced pressure. The concentrate was acidified with dilute HCl and extracted with ethyl acetate (3× 75 ml.). The extract was dried over magnesium sulfate and the solvent removed under reduced pressure. The residue was stirred with benzene (250 ml.) until crystalline, filtered, washed with hexane and dried. There was obtained 16.0 g. of product (M.P. 77–9° C.).

*Analysis.*—Calculated for $C_5H_9NO_5$: C, 36.81; H, 5.56; N, 8.58. Found: C, 36.49; H, 5.48; N, 8.13.

Preparation of N-(methoxycarbonyl) aminoöxyacetic acid

Aminoöxyacetic acid hemi-hydrochloride (11.99 g., 0.11 eq.), acetic acid (50 ml.) and methyl chloroformate (9.4 g., 0.1 mol) were stirred, heated and refluxed 3 hours. The mixture was cooled and volatile material removed under reduced pressure. The residue was extracted with hot ethyl acetate (80 ml.) and the extract diluted with hexane (400 ml.) and stirred overnight. The product was removed by filtration and dried giving 8.7 g. (M.P. 85–87° C.).

*Analysis.*—Calculated for $C_4H_7NO_5$: C, 32.22; H, 4.73; N, 9.39. Found: C, 32.35; H, 4.82; N, 9.21.

Preparation of sodium N-(3-carboxypropionyl) aminoöxyacetate

Aminoöxyacetic acid hemi-hydrochloride (10.9 g., 0.1 eq.) and methanol (100 ml.) were stirred while immersed in an ice bath. This solution was neutralized to a phenophthalein end-point by the dropwise addition of a solution of sodium methoxide in methanol. The neutralized mixture was stirred 30 min., then filtered to remove sodium chloride. The filtrate was added to a solution of succinic anhydride (0.1 mol) in methanol (300 ml.). This mixture was stirred 30 minutes and the product removed by filtration, washed with methanol (100 ml.) and dried. There was obtained 16.1 g. (M.P. 178–80° C) of the desired product.

*Analysis.*—Calculated for $C_6H_8NaNO_6$: C, 33.81; H, 3.78; N, 6.57; Na, 10.79. Found: C, 33.75; H, 3.99; N, 6.20; Na 10.66.

In controlling plant growth by means of herbicides it is necessary to obtain penetration of the formulation through waxy protective layers to obtain contact with plant fluids, and once contact is obtained, water solubility is desirable so as to cause the systemic migration of the herbicide. Water solubility and ability to penetrate or dissolve waxy cuticle are characteristics which seldom appear in a single substance and, in most instances, are not possessed by the herbicides themselves. It is therefore necessary to employ organic solvents in combination with solubilizers, dispersants, emulsifiers or other surface active agents in herbicide formulations. Furthermore, when using highly active herbicides, it is difficult to obtain uniform distribution of a small quantity of material unless it is dispersed or dissolved in a larger quantity of diluent before application. Preferred diluents are water and inert solids. From a practical standpoint, water is the preferred diluent because it is cheap and spray application is more convenient than dusting. The preferred formulations for use in the present method are water-dispersible solutions of herbicides in organic solvents or dispersible powders. The herbicides themselves are soluble in water in the form of water-soluble salts, so they may be sold and transported as conecentrated aqueous solutions. In warm climates where there is no danger of freezing and breaking containers, aqueous solutions may be preferred, especially solutions of sodium or ammonium salts.

What is claimed is:

1. The method of combating undesired plant growth which comprises applying to the locus of the plant a herbicidally effective quantity of a carboxamidoöxyalkanoic acid represented by the general formula $$X-\overset{O}{\underset{}{C}}-\overset{H}{\underset{}{N}}-O-\overset{R}{\underset{H}{C}}-(CH_2)_n-COO[Y]H$$

in which X represents a member of the group consisting of

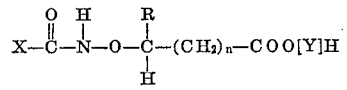

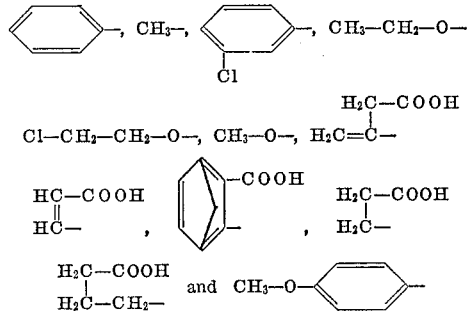

R represents one of the group consisting of hydrogen and lower alkyl, and $n$ may vary within the range of zero to one.

2. The method according to claim 1 in which the carboxamidoöyalkanoic acid is applied in the form of an aqueous solution of an ammonium salt of said acid.

3. The method according to claim 1 in which the carboxamidoöyalkanoic acid is applied in the form of an aqueous solution of a sodium salt of said acid.

4. The method according to claim 1 in which the carboxamidoöxyalkanoic acid is applied in the form of an aqueous solution of a potassium salt of said acid.

References Cited

UNITED STATES PATENTS 3,162,525 12/1964 Leasure _____ 71—113
3,282,987 11/1966 Ellis _____ 260—471
3,396,009 8/1968 Neighbors _____ 71—115

LEWIS GOTTS, *Primary Examiner.*

MELVYN M. KASSENOFF, *Assistant Examiner.*

U.S. Cl. X.R.

71—113, 115; 260—453, 482, 501.11, 514, 519, 534

UNITED STATES PATENT OFFICE
CERTIFICATE OF CORRECTION

Patent No. 3,449,113

June 10, 1969

Ralph P. Neighbors

It is certified that error appears in the above identified patent and that said Letters Patent are hereby corrected as shown below:

Columns 3 and 4, fourth entry under column heading "Soybeans" should read -- F2,G2 --; same columns 3 and 4, the ninth formula under the heading "Structural Formula of Compound", that portion reading

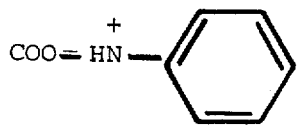    should read    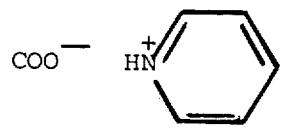

same columns 3 and 4, eleventh formula under the heading "Structural Formula of Compound", that portion reading

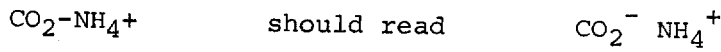

same columns 3 and 4, twelth formula under the heading "Structural Formula of Compound", that portion reading

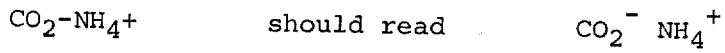

Column 8, line 8, "conecentrated" should read -- concentrated --.

Signed and sealed this 14th day of April 1970.

(SEAL)
Attest:

EDWARD M. FLETHCER, JR.
Attesting Officer

WILLIAM E. SCHUYLER, JR
Commissioner of Patents